United States Patent [19]

Gebhardt

[11] Patent Number: 5,676,467
[45] Date of Patent: Oct. 14, 1997

[54] SLITTED PLASTIC BAG CAPABLE OF HOLDING FLAT, AWKWARD OBJECTS

[75] Inventor: Terry D. Gebhardt, Longview, Tex.

[73] Assignee: TC Manufacturing Co., Inc., Evanston, Ill.

[21] Appl. No.: 673,639

[22] Filed: Jun. 26, 1996

Related U.S. Application Data

[63] Continuation-in-part of Ser. No. 369,344, Jan. 6, 1995, abandoned.

[51] Int. Cl.⁶ ............... B65D 30/20; B65D 33/08
[52] U.S. Cl. ............... 383/10; 383/66; 383/120
[58] Field of Search ............... 383/66, 67, 104, 383/120, 10

[56] References Cited

U.S. PATENT DOCUMENTS

| | | | |
|---|---|---|---|
| 3,228,583 | 1/1966 | Dougherty | 383/120 X |
| 3,497,130 | 2/1970 | Stahl | 383/10 |
| 3,519,197 | 7/1970 | Campbell | 383/66 X |
| 3,650,383 | 3/1972 | Nigro | 383/66 X |
| 3,669,347 | 6/1972 | Platz et al. | |
| 3,682,372 | 8/1972 | Rodley | |
| 3,834,528 | 9/1974 | Pickford et al. | 383/120 X |
| 3,896,981 | 7/1975 | Purple | 383/10 X |
| 3,987,959 | 10/1976 | Deards et al. | 383/120 X |
| 4,209,116 | 6/1980 | Hendricks | 383/10 X |
| 4,550,442 | 10/1985 | Lepisto | |
| 4,570,820 | 2/1986 | Murphy | 383/66 X |
| 4,578,814 | 3/1986 | Skamser | 383/66 X |
| 4,717,262 | 1/1988 | Roen et al. | |
| 4,848,930 | 7/1989 | Williams et al. | |
| 4,895,742 | 1/1990 | Schaub et al. | 383/16 X |
| 4,929,224 | 5/1990 | Hanson et al. | |
| 5,026,173 | 6/1991 | Jensen | |
| 5,110,005 | 5/1992 | Schilling | 383/66 X |
| 5,158,368 | 10/1992 | Lichtwardt et al. | |

FOREIGN PATENT DOCUMENTS

| | | | |
|---|---|---|---|
| 2519320 | 7/1983 | France | 383/7 |
| 5305956 | 11/1993 | Japan | 383/66 |
| 1273157 | 5/1972 | United Kingdom | 383/10 |
| 2254065 | 9/1992 | United Kingdom | 383/120 |
| 94000357 | 1/1994 | WIPO | 383/122 |

Primary Examiner—Jes F. Pascua
Attorney, Agent, or Firm—Lee, Mann, Smith, McWilliams, Sweeney & Ohlson

[57] ABSTRACT

A plastic bag is disclosed of the type to hold flat or awkward shaped objects, which is constructed of a top, a bottom, a first and second end, and two sides. A slit is utilized to allow entry into the bag. The slit may be positioned across the side or across the top.

4 Claims, 3 Drawing Sheets

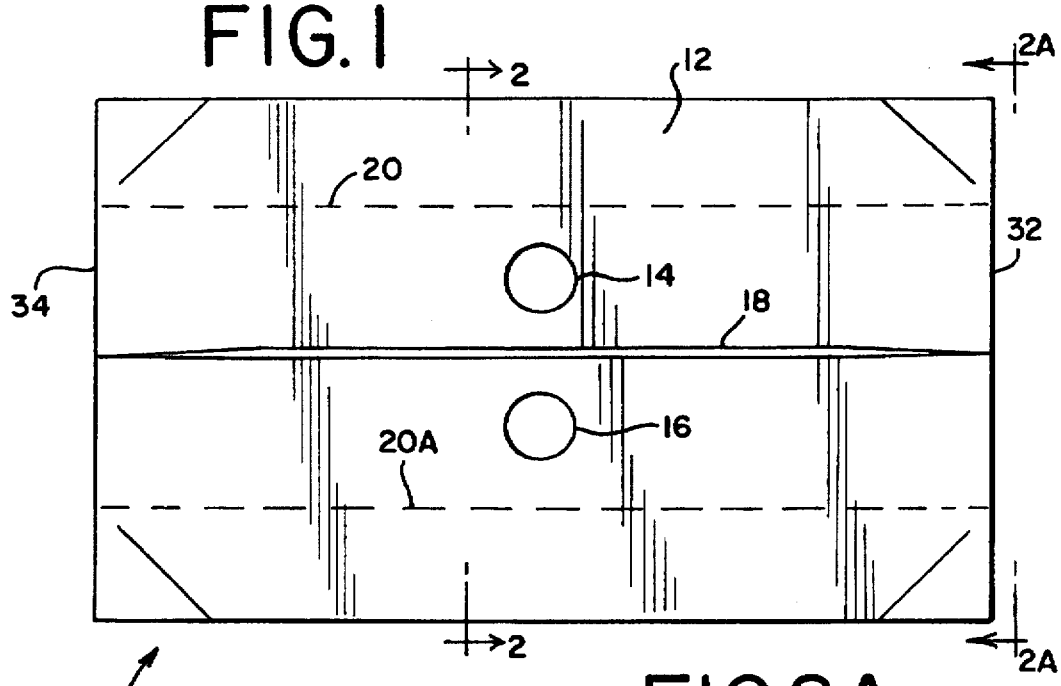
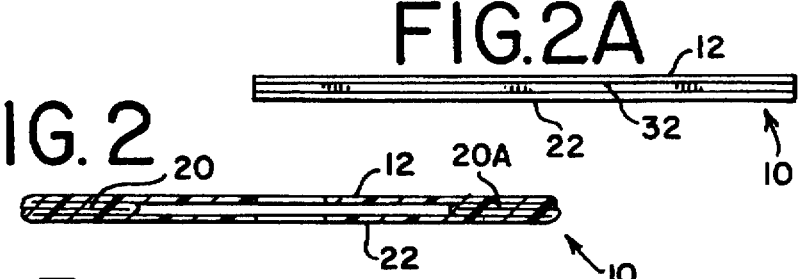
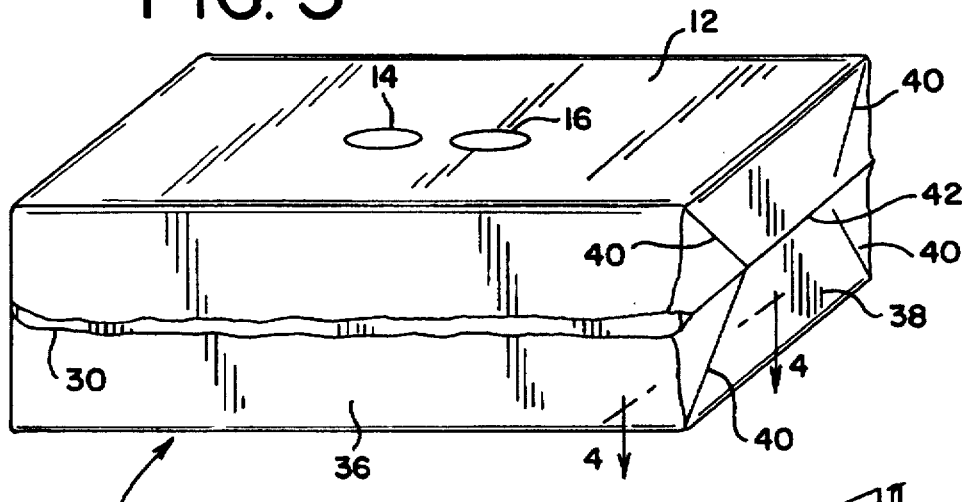

SLITTED PLASTIC BAG CAPABLE OF HOLDING FLAT, AWKWARD OBJECTS

This application is a continuation-in-part of application Ser. No. 08/369,344 filed Jan. 6, 1995, now abandoned.

FIELD OF THE INVENTION

The present invention generally relates to plastic bags, and more specifically, relates to an improved plastic bag which is capable of holding awkwardly shaped articles.

BACKGROUND OF THE INVENTION

Plastic bags have become very popular in supermarkets and stores due to their light weight, strength and easy disposability. Additionally, plastic bags have a relatively low cost to manufacture when mass produced. However, users generally face several problems when using plastic bags.

First, when odd or unusually shaped objects are packaged, current plastic bags do not hold the object well. The object tends to either not fit into the bag at all, not fit properly, or alternatively, it fits in the bag initially, but tends to fall out of the bag while being carried. Other problems include the object moving freely within the package, upsetting, spilling or rearranging the contents within the object. Thus, the shape of the plastic bag has a tremendous impact on how well the bag holds the object.

Second, loading the object into the bag can be troublesome. With awkward or bulky items to carry, a proper entryway into the package is required. Otherwise, the user must struggle with the bag to insert the item into it. The types of awkward or bulky objects referred to can be anything, but in particular are large, flat items such as a party trays, pizza boxes or a fast-food salad. Alternative shapes of objects include large rectangular objects that do not fit well within standard size plastic bags. These items are hard to handle to begin with, and are very difficult to insert in currently available packaging.

The awkward item need not be large. This invention is not limited in size, and the size of the bag may vary from small to large, depending upon the item to be held. For example, it is contemplated that fast food children's meals, which are packaged in relatively flat boxes, may fit conveniently in a smaller bag contemplated by this invention.

Third, when storing awkward or bulky items, current practice usually entails finding a bag large enough to lay the object down in the bag flat. The bag is found, and the item is laid down in the bottom. The remainder of the bag is left empty, wasting space and material. Usually, items cannot be stacked on top of the object, to protect it from being crushed. Additionally, the bag, filled as such, is difficult and awkward to carry.

Fourth, current bags on the market sometimes lack the strength to hold heavy items. The bags lack proper design of the bag, and needed reinforcement in critical areas of weakness, such as at the corners. For example, U.S. Pat. No. 4,848,930 discloses a plastic bag with a single, bottom gusset. This bag is self-standing, but is designed with upwardly folding front and rear walls to form a single gusset. This bag lacks the side gussets of the current invention, and more importantly, fails to allow easy insertion and holding of awkwardly shaped objects.

U.S. Pat. No. 5,158,368 shows a plastic bag with side gussets, and a "handle panel" that is heat sealed to the outer portion of the front and rear panels. This heat sealing step is too expensive and time consuming to make this bag practicable. Furthermore, this bag is not designed to hold large, awkward objects such a flat trays.

SUMMARY OF THE INVENTION

It is an object of the present invention to overcome the disadvantages of prior art plastic bags of the type described. It is specifically contemplated that the present invention provide a bag capable of holding large, awkwardly shaped items and that the bag may be easily filled with the item.

It is another object of the present invention to provide such a plastic bag which is convenient and reliable in use, yet inexpensive to manufacture.

It is another object of the present invention to manufacture a bag that is strong enough to hold the items contemplated to be held within it.

Accordingly, one embodiment consists of a plastic bag having a top and a bottom, side gusset fold lines, and end seals. The top has a center slit in the top which comprises the bag opening. This slit extends along the top of the bag and down the sides of the bag so that the slit ends roughly adjacent the side seal. The top also has handle holes placed adjacent the slit.

In another embodiment, a plastic bag has a top and a bottom, side gusset fold lines, end seals and square bottom seals. The plastic bag has two lateral sides and two end sides, one lateral side having a slit placed horizontally in the middle of the lateral side. The two end sides have the end and square bottom seals. The top has two handle holes placed parallel to the slit, so that when the bag is picked up, the stress is placed on ends with the square bottom seals.

BRIEF DESCRIPTION OF THE DRAWINGS

FIG. 1 is a plan view of one embodiment of the bag of this invention.

FIG. 2 is a view taken along the lines 2—2 of FIG. 1.

FIG. 2A is a view taken along the lines 2A—2A of FIG. 1.

FIG. 3 is a perspective view of another embodiment of the invention with a side slit opening instead of a top slit opening.

FIG. 4 is a view taken along the lines 4—4 of FIG. 3.

DETAILED DESCRIPTION OF THE DRAWINGS

Figure 5:
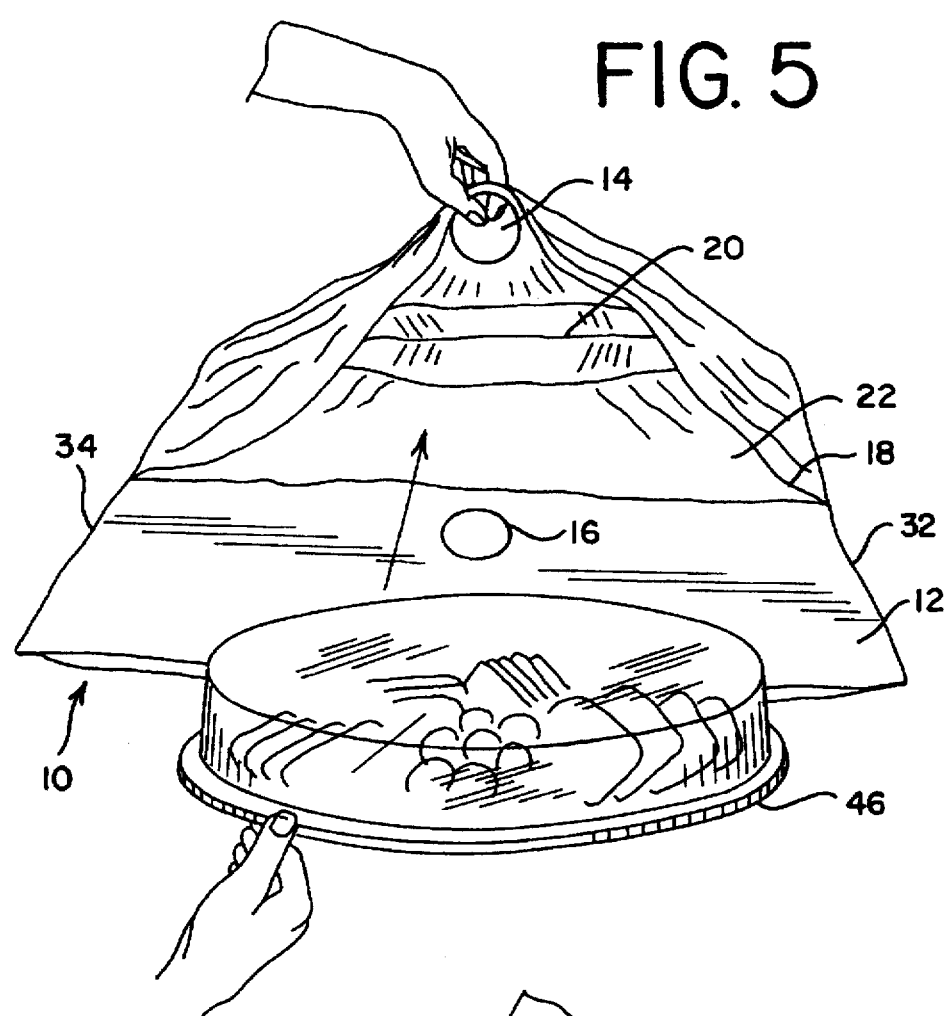
FIG. 5 shows a tray of food being loaded into the embodiment of FIG. 1.

Turning to the drawings, FIG. 1 shows a top loading, side gusseted bag. The plastic bag 10 is shown, having a top slit 18 running across the top. Handle holes 14, 16 are available for carrying the bag. The side gusset fold lines 20, 20A are shown in FIG. 2. End seals 32, 34 join the top of the bag 12 with the bottom of the bag 22. The end seals are formed by heat sealing the top 12 and the bottom 22 together. The side gusset fold lines 20, 20A in FIG. 2 allow the bag to lay flat until the bag is ready to use.

FIG. 2A shows the end seals of the bag.

FIG. 3 shows an alternative embodiment of the present invention having a side slit 30 that allows for entry into the bag. A first end 38 and a second end (not shown) are formed with square end seals to make the bag more box-like, so that it holds square or rectangular items with ease. End seals 42 on the first and second ends of the bag heat seal the gusset folds together. Square bottom seals 40 form a box-like pocket to hold the product inside the bag and prevent the product from falling out.

These square bottom seals are formed by heat sealing each fold or half of the gussets together with a diagonal weld. FIG. 4 is a view that shows the square bottom seal taken along lines 4—4 of FIG. 3. The extra material folded over to form the square bottom seals can clearly be seen. A detailed explanation of making the square bottom seals is given below.

Looking at FIG. 3, the holes 14, 16 in the top side are placed parallel to the side slit. By placing the holes parallel, when the bag is picked up, the stress is placed on the ends 38 of the bag, and not the sides 36. Otherwise, objects placed in the bag could possibly fall out if the holes were placed perpendicular to the slit.

Figure 7:
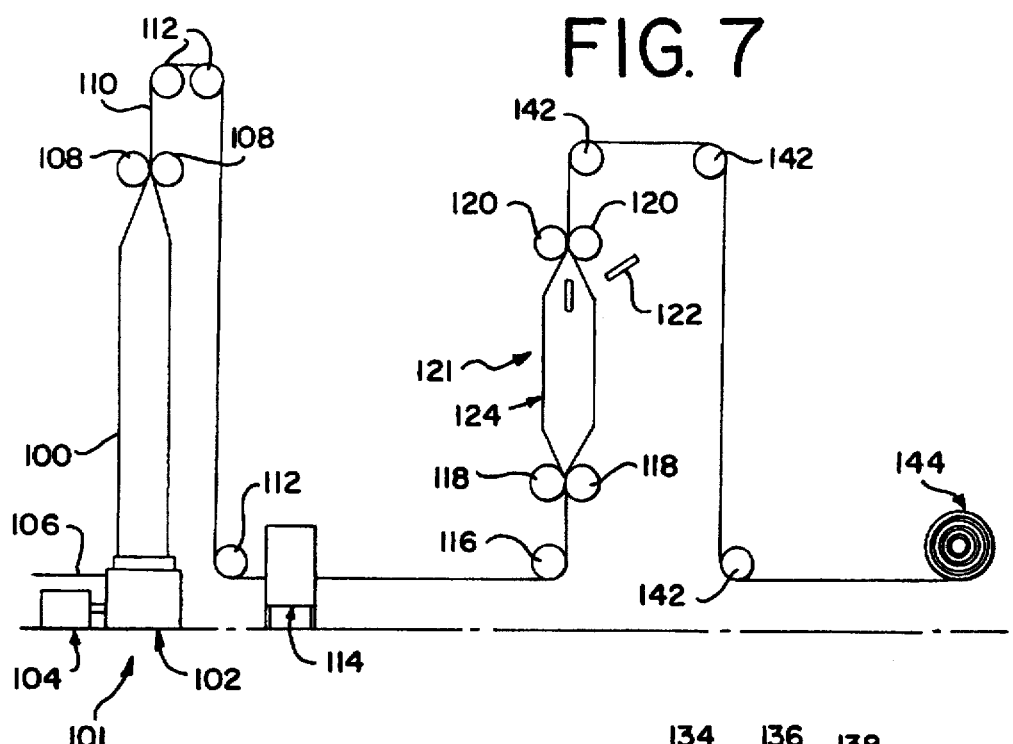
FIG. 7 is a diagrammatic view illustrating schematically the formation and processing of plastic tube stock for forming bags of the type shown in FIGS. 1–6.

Generally, these bags 10 are formed in a continuous process. Referring now to FIG. 7, there is illustrated the various method steps that may be employed in accordance with the invention to form the tube stock from which the bag 10 is made. The bags 10 are formed from tubular bag stock that is formed from polyethylene, polypropylene or their equivalents. The bag thickness varies depending upon the load to be carried within the bag. It does not matter whether or not the tube stock is formed in the apparatus set up to make the bag of the invention, or whether the tube stock is previously formed, rolled up, and then at a later date unrolled for processing. In other words, the invention may be made continuously or in batchs, whichever may be most economical.

In the form shown in FIG. 7 a plastic tubing 100 is formed at a tube stock forming station 101 by a suitable blown film process utilizing a blowing die 102 of any suitable commercially available type, a suitable extruder 104 for supplying plastic material of the type indicated for the blowing die 102, and a source of air pressure to which a suitable conduit 106 is connected. The conduit 106 is in suitable communication with the die 102 for forming a continuous seamless plastic film tube 100. The tube 100 after its formation is collapsed into flattened relation by a pair of opposed pinch rollers 108 after the plastic material defining the tube 100 is sufficiently cooled and solidified to form the basic tube 100. The pinch rollers 108 thus form the basic tube stock 110 from which the bags 10 are to be formed, with the tube stock 110 being flattened to form gussets on each end.

The arrangement of FIG. 7 illustrates the tube stock 110 being passed around suitable idler rollers 112, and the tube stock 110 may then be passed through a suitable printing station 114 where any needed indicia or decoration can be printed on the exterior surfacings of the tube stock.

The tube stock 110 moves on to the next stage of its processing, around idler roller 116, to pass between the oppositely acting pinch rollers 118, where it is reinflated by a standing or stationary column of air which is trapped between the sets of pinch rollers 118 and the downstream located set of pinch rollers 120 at inflating station 121. The source of air pressure involved (not shown) is placed in communication with the nozzle 122 that is initially inserted through a suitable puncture made in the tube stock to inflate the same (the leading end of the tube stock 110 having been initially fed through rollers 118 and 120 for this purpose) as indicated in FIG. 7, whereupon the nozzle 122 is withdrawn and the tube stock resealed prior to start up of further feeding or driving of the tube stock 110 beyond pinch rollers 120 of station 121. This forms inflated stationary portion 124 of the tube stock 110.

Figure 8:
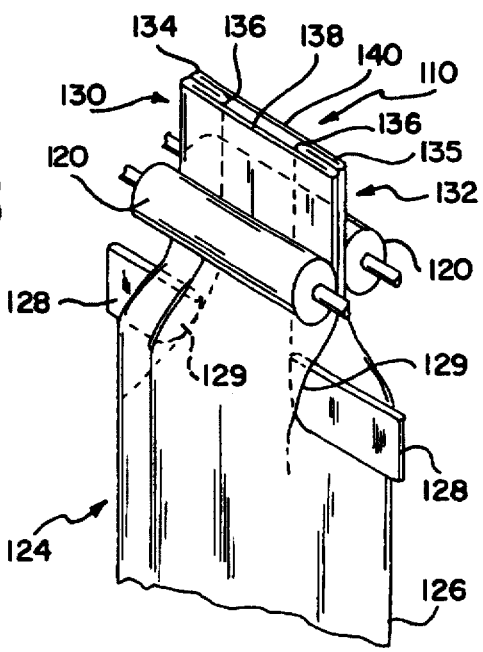
FIG. 8 is a perspective view illustrating the manner in which the side gusset fold lines are formed in the tube stock.

As the tube stock 110 moves through the tube stock inflated portion 124, the wall structure 126 defining same is formed to define side pleats 130 and 132 on either side of the wall structure 126 as shown in FIG. 8. In practice this may be done by providing at station 121 the opposed or oppositely directed pleat forming die plates 128 that are fixedly mounted in any suitable manner relative to the tube stock wall structure 126 so that when the inflated portion 124 is inflated and the tube stock fed through the same, the opposed ends 129 of the respective forming die plates 128 reshape the tube stock wall structure 126 to define the respective side pleats 130 and 132 that (downstream of station 121 ) thus extend longitudinally of the tube stock 110 along either of the respective side edgings 134 and 135 of the same. It will be observed from FIG. 8 that the respective side edge pleats 130 and 132 are similar in nature and comprise an inwardly extending fold 136 of the wall structure 126 which is disposed between the respective tube stock side portions 138 and 140 that are disposed closely adjacent to each other with the folds 136 in infolded relation therebetween, as indicated in FIG. 8. Thus, the edgings 134 and 135 in essence are pleats that, in accordance with the invention, are maintained through the remainder of the processing steps effected on the tube stock 110 to form the gussets 20 and 20A of the individual bags 10.

The deflated tube stock is then passed around idler rollers 142 and can either be rolled up into a roll, 144 for batch processing as described below, or run continuously.

The roll of stock enters the synchronous section 150, where compensating dancer rolls (which are well known in the industry) turn the continuous motion of the tube stock into stop and start motions. The dancer rolls pick up the slack generated by the continuous motion when the tube stock is stopped. This allows various cutting and heat sealing operations to be performed on individual bags when the motion of the tube stock is stopped.

Figure 9:
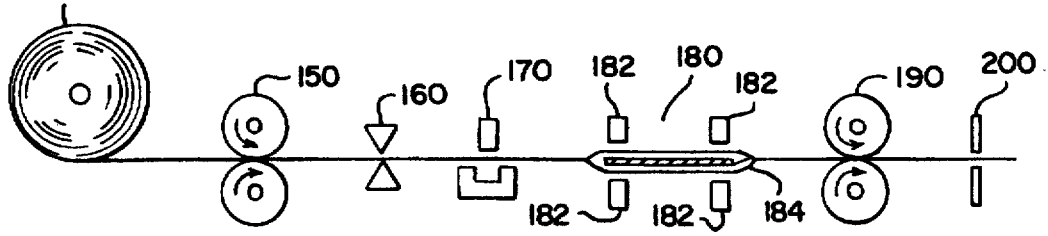
FIG. 9 is a diagrammatic view illustrating schematically the finishing of the tube stock into the bags of the type shown in FIG. 1.

The bag 10, still connected to bags before and after it, next has cutting operations performed on it at station 160 shown in FIG. 9. The bag 10 may have the top 18 or side slit 30 cut into it, or it may have the handle holes 14 and 16 cut into it. If the bag 10 is to have a side slit 30, the razor is simply rotated 90° from the location of where razor would be placed for a top slit 18 to be cut. Which ever cutting operation (holes or slits) is done first, the other operation is done next. As shown in FIG. 9, the slits are cut first at station 160, followed by the holes being punched at station 170.

If the bag is to have square bottom seals 40 (see FIG. 3), they are added at sealing station 180 as shown in FIG. 9. The top and bottom folds of the gussets are separated by a metal plate 184. Heated plates 182 then places heat seals on both the top and bottom folds of the gussets at approximately a 45° degree angle to the gusset. This seals the fold layers of the gusset together. If the bag does not have square bottom seals 40 as shown in FIG. 3, then this station 180 is not used.

Draw rollers 190 shown in FIG. 9 then pull the flattened tube forward. The tube has been cut, heat sealed and printed at this stage. The bags are almost finished.

At the final station, a heated knife called a seal bar 200 (FIG. 9) cuts the bag and seals it in one motion. This forms the end seals 32, 34 shown in FIG. 6. An end seal may also be called a side seal. However, this invention is not limited to being made with a side seal. It can also be made with a bottom seal, wherein a flat, heated bar puts the end seal in, and then a razor cuts the bag a short distance from the seal. The end seal of the current invention can be made with either the side seal or the bottom seal.

Figure 6:
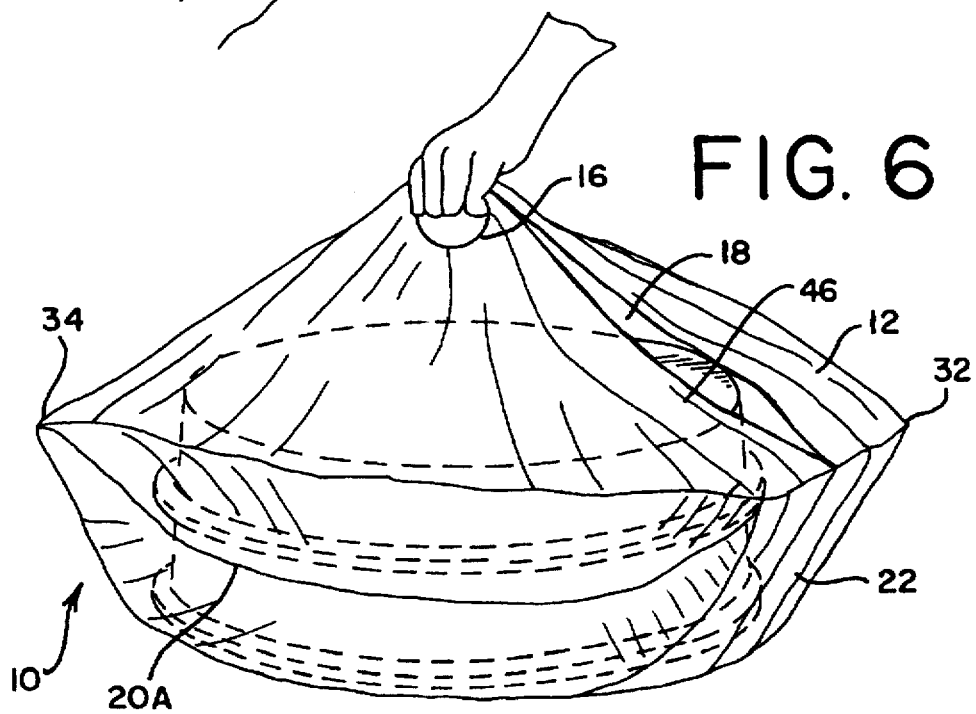
FIG. 6 shows the embodiment of FIG. 1 being used to carry two trays of food.

FIG. 5 shows a tray of food being loaded into the embodiment of FIG. 1. The slit 18 is shown in the opened mode. The hand grasps the handle opening 14 and lifts up the top side 12, and the tray 46 of food is slid into the bag. The other handle opening 16 is then used to slide the other half of the top 12 over the tray 46. FIG. 6 shows a fully loaded bag that is being carried away.

Although a preferred embodiment of the invention has been disclosed for illustrative purposes, those skilled in the art would appreciate that many additions, modifications and substitutions are possible, without departing from the scope and the spirit of the invention as defined by the accompanying claims.

What is claimed is:

1. A side end-opening bag capable of securely holding awkwardly shaped objects comprising, in combination:

a top side having a fast edge opposite a second edge, and a third edge opposite a fourth edge; said top side having finger holes substantially centered therein;

a bottom side opposite said top side;

a fast side and a second side opposite said first side, said first side being integral with said top side along said first edge formed from a continuous sheet and said second side being integral with said top side along said second edge formed from a continuous sheet and said first side and said second side being integral with said bottom side;

said first side having two first side ends;

a horizontal slit extending from one said first side end to other said first side end, whereby said first side is equilaterally divided into two substantially equal side portions;

said first side and said second side being folded inwardly when flat to form horizontal side gusset fold lines;

a first end and a second end opposite said first end, said first end being integral with said top side along said third edge formed from a continuous sheet, and said second end being integral with said top side along said fourth edge formed from a continuous sheet;

said first end and said second end having an upper segment and a lower segment;

said upper segment of said first end being sealed with said lower segment of said first end;

said upper segment of said second end being sealed with said lower segment of said second end; and said first end and said second end being integral with said bottom side, said first side and said second side, whereby said top side and said bottom side, said first side and said second side, and said first end and said second end form a compartment to hold said objects.

2. A bag according to claim 1 wherein said first end and said second end have square bottom seals, each said square bottom seal being formed by a heat sealing fold.

3. A bag according to claim 1 wherein said bag is made of plastic.

4. A bag according to claim 1 wherein said top side has handle holes for carrying said bag.

* * * * *